Jan. 14, 1969 C. DE KONING 3,422,367

DEVICE FOR SIMULTANEOUSLY RECORDING AND/OR REPRODUCING DIFFERENT SIGNALS

Filed May 19, 1966 Sheet 1 of 2

INVENTOR.
CORNELIS DE KONING

BY
Frank R. Trifari
AGENT

INVENTOR.
CORNELIS DE KONING
BY
Frank R. Trifari
AGENT

United States Patent Office
3,422,367
Patented Jan. 14, 1969

3,422,367
DEVICE FOR SIMULTANEOUSLY RECORDING AND/OR REPRODUCING DIFFERENT SIGNALS

Cornelis De Koning, Emmasingel, Eindhoven, Netherlands, assignor to North American Philips Company, Inc., New York, N.Y., a corporation of Delaware Filed May 19, 1966, Ser. No. 551,327
Claims priority, application Netherlands, June 5, 1965, 6507233
U.S. Cl. 330—59 6 Claims
Int. Cl. H03f 17/00

ABSTRACT OF THE DISCLOSURE

A signal amplifier switching system for substituting an amplifier into a multi-amplifier multi-channel recording/reproducing device upon indication of a defective amplifier is constructed with a signal amplifier in each channel, one of the signal amplifiers in one of the channels being employed for time signals. Each of the amplifiers has a detector coupled to the output thereof and responds to the absence of an auxiliary signal, which is continuously applied to all of the amplifiers, for switching the amplifier signal channel associated with the channel containing an absent auxiliary signal into the time signal amplifier channel. A detector coupled to the time signal amplifier similarly responds to a breakdown in the time signal amplifier for switching the time signal channel into one of the other signal channels.

The invention relates to a device for the simultaneous recording and/or reproduction of different signals in or from tracks of at least one record carrier. In such a device each signal is recorded through an associated amplifier in a track associated with said amplifier and one of said signals provides time information. A spare amplifier takes over the function of a signal amplifier immediately after the signal amplifier fails to operate.

Such devices are frequently used on airfields for recording the conversations between pilots and the ground station. In a known device there is provided a separate spare amplifier having its own track, which is always ready for use and which is switched on as soon as one of the other amplifier fails to operate.

According to the invention the time signal amplifier serves as a spare amplifier for the signals not providing time information, which amplifier continues operating as a time signal amplifier and/or one of the other amplifiers serves as a spare amplifier for the time signal, the latter amplifier continuing operating as an amplifier for its own signal.

This has the advantage that a separate spare amplifier may be dispensed with, while the full number of tracks can be employed for the useful signals.

In one embodiment of the device according to the invention means are provided for applying an auxiliary signal to the input of the amplifier, each of which amplifiers is associated with a switch which is controlled by the auxiliary signal detected at the output of the amplifier, said switch changing over the input of the relevant amplifier in the absence of the auxiliary signal to the input of the time signal amplifier and/or the time signal amplifier, in the absence of the auxiliary signal, to the input of any of the other amplifiers.

The advantage is that each amplifier is checked at all times as well as in the absence of an input signal.

In a further device embodying the invention the switch is formed by a photo-electric resistor arranged between the input of the relevant amplifier and the time signal amplifier, said photo-resistor being exposed, in the absence of the auxiliary signal, to an incandescent lamp.

In this manner a simple and reliable change-over is obtained, and the disadvantage involved in mechanical contacts are avoided.

In a further device embodying the invention the time signal is attenuated when an amplifier is changed over. It is thus possible to overhear the time signal and the incoming signal selectively.

In a further embodiment of the device according to the invention there is provided a blocking circuit which prevents the switch from switching back to the relevant amplifier, when the auxiliary signal has been lacking and has re-appeared. Even a transient failure of an amplifier is thus signalled continuously.

A still further embodiment of the device according to the invention comprises a locking member which prevents the change-over of a second signal after the change-over of a signal to a further amplifier. In the event of a second failure of the apparatus the signal already changed over can thus not be disturbed by a second signal.

The foregoing will now be explained more fully with reference to the following figures.

Figure 1:
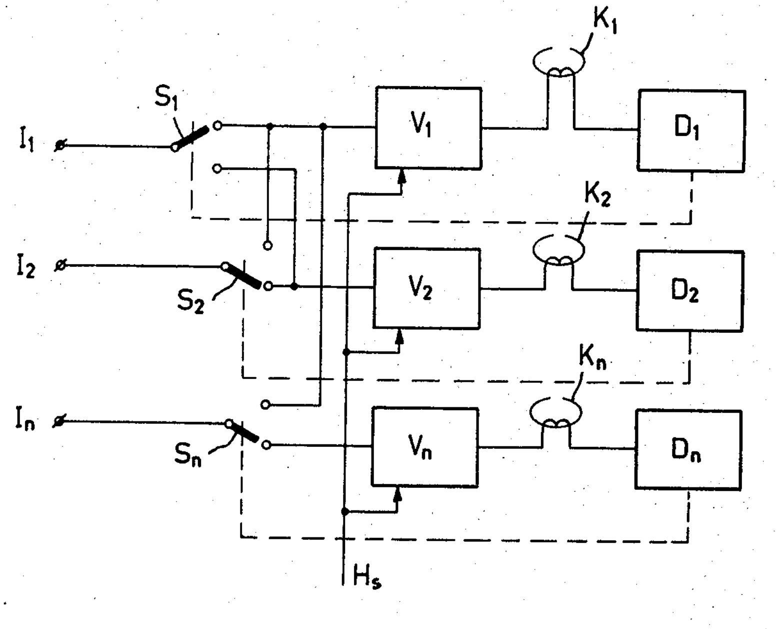
FIGURE 1 shows the basic diagram of a device according to the invention.

As is shown in FIG. 1, the signals are applied via the input $I_1$ to $I_n$ to the amplifiers $V_1$ to $V_n$, to which amplifiers there is applied, in addition, an auxiliary signal $H_s$. The ouput signal is fed to the recording heads $K_1$ to $K_n$ and, moreover, to detection members $D_1$ to $D_n$. These detection members are constructed so that, when the auxiliary signal fails to appear at the output of one of the amplifiers, for example, the amplifier $V_2$, the switch $S_2$ is changed over and the signal of the input $I_2$ is switched over to the input $I_1$ of the time signal amplifier $V_1$. The same occurs in the absence of the output signals of the other amplifiers with the exception of that of the time signal amplifiers $V_1$, in which the switch $S_1$ is changed over and the time signal is applied to the input $I_2$ of the amplifier $V_2$. When an amplifier fails to operate, a signalling device (not shown) produces an alarm, so that the defective amplifier can be replaced as soon as possible by another.

Figure 2:
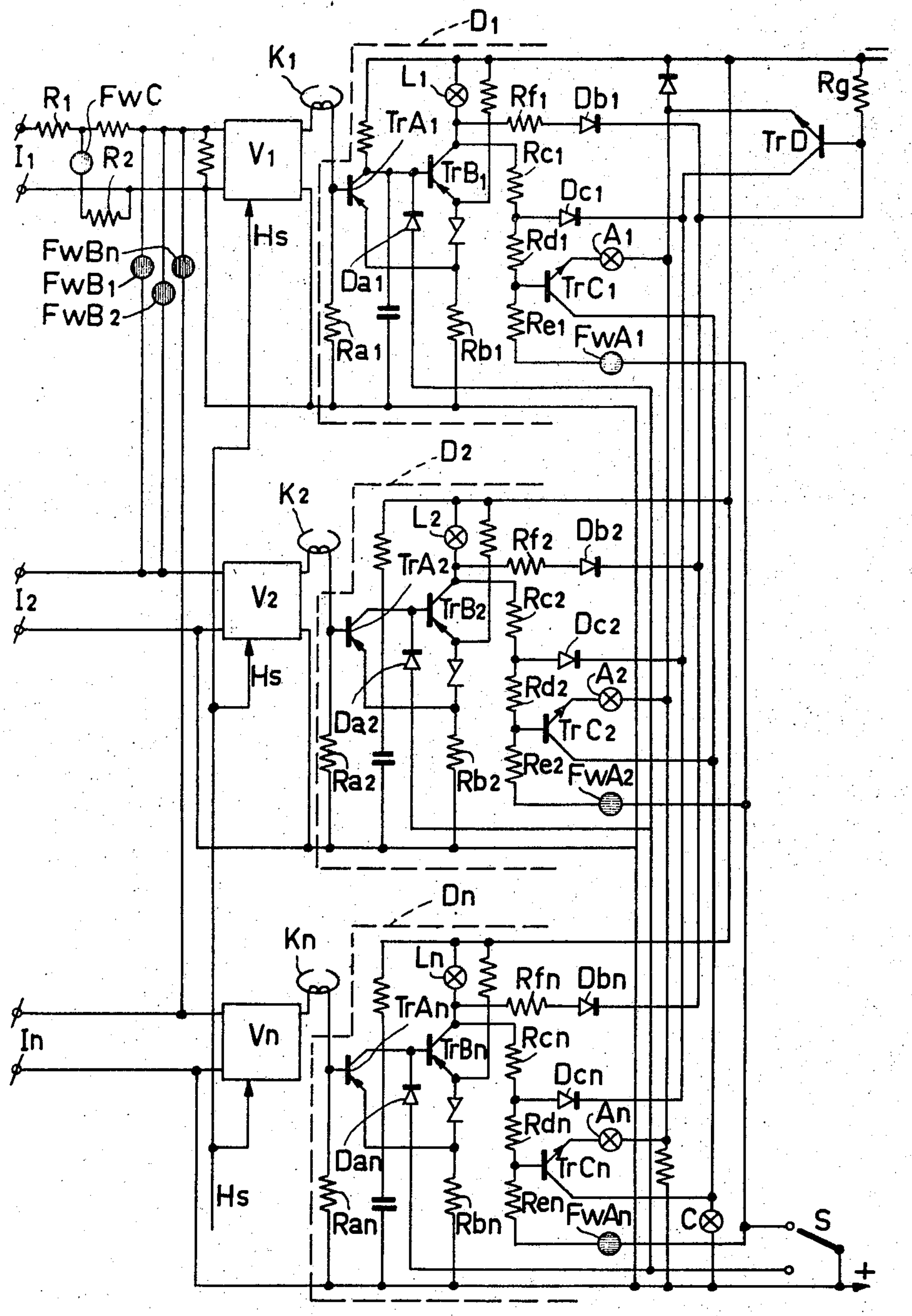
FIG. 2 shows a circuit diagram of a device according to the invention.

FIG. 2 shows a circuit diagram of one embodiment of the device according to the invention. The signals are fed to the inputs $I_1$ to $I_n$ and the channel connected to the input $I_1$ serves for time information. The signals are amplified in the amplifiers $V_1$ to $V_n$, associated with the inputs $I_1$ to $I_n$, an auxiliary signal $H_s$ being, in addition, fed to the inputs of said amplifiers. The output signals are fed to the heads $K_1$ to $K_n$, which are connected each in series with a resistor $Ra_1$ to $Ra_n$ respectively, to which resistors are connected the associated detection members $D_1$ to $D_n$. The voltages across said resistors $Ra_1$ to $Ra_n$ are amplified and detected in the transistors $TrA_1$ to $TrA_n$. The potential of the base of the further transistors $TrB_1$ to $TrB_n$ is chosen to exceed the potential of the emitters of said transistors to an extent such that these transistors do not convey current and the signalling lamps $L_1$ to $L_n$ included in the collector circuits of said transistors do not burn. If one of the amplifiers $V_1$ to $V_n$, for example, $V_2$, becomes defective, the signal at the base of the transistor $TrA_2$ will fail to appear so that this transistor is no longer conducting and the base of the transistor $TrB_2$ becomes more negative than the emitter thereof, said transistor thus becoming conducting and the lamp $L_2$ being ignited. Since the emitter of the transistor $TrA_2$ is fed via the resistor $Rb_2$, it becomes negative by the current passing through the transistor $TrB_2$ to an extent such that at a re-appearance of the signal the transistor $TrB_2$ is prevented from again conveying current, so that the lamp $L_2$ continues burning. This lamp serves for signalling the defective amplifier $V_2$. Voltage dividers formed by the resistors $Rc_1$, $Rd_1$, $Re_1$ to $Rc_n$, $Rd_n$, $Re_n$ and the photo-resistors $FwA_1$ to $FwA_n$, which connect the collectors of the transistors $TrB_1$ to $TrB_n$ to the positive supply voltage, has connected to it the bases of the transistors $TrC_1$ to $TrC_n$. The emitter circuits of said transistors include incandescent lamps $A_1$ to $A_n$ respectively. In the unexposed state the value of the photo-resistors $FwA_1$ to $FwA_n$ is so high with respect to the resistors $Rc_1$, $Rd_1$, $Re_1$ to $Rc_n$, $Rd_n$, $Re_n$ that these bases are practically at the negative potential, so that these transistors are not conducting as long as the lamps $L_1$ to $L_n$ do not burn. As soon as for example the lamp $L_2$ starts burning, the base of $TrC_2$ becomes more positive to an extent such that this transistor becomes conducting, so that the lamp $A_2$ is ignited and the photo-resistor $FwA_2$ is exposed, the resistance value thereof dropping to such a low level that said transistor continues conducting, even with the lamp $L_2$ extinguished. The lamp $A_2$ also illuminates the photo-resistor $FwB_2$ so that the input of the amplifier $V_2$ is connected through the low value of the photo-resistor $FwB_2$ to the input of the spare amplifier $V_1$, while the signal of the input $I_2$ is recorded via the spare amplifier $V_1$ in the track associated herewith.

As soon as one of the amplifiers $V_2 \ldots V_n$ stops functioning, for example $V_2$, and the transistor $TrC_2$ starts to conduct the bulb *c* connected in the common collector circuit lights up and throws its light upon the photo-resistor $F_wC$. As a result the time-signal at the input $S_1$ is attenuated and fed to the amplifier $V_1$. If, for example, the amplifier $V_2$ fails to operate and the transistor $TrB_2$ is conducting, the potential of its collector becomes more positive. Through the resistor $Rf_2$ and the diode $Db_2$ the base of the transistor $TrD$ also becomes slightly more positive, while the base resistor $Rg$ is chosen so high, that this transistor just remains non-conducting. As soon as a second amplifier, for example $V_n$, fails to operate, the current across $Rg$ and also the potential of the base of $TrD$ become so high that the latter becomes conducting, its collector becoming negative to an extent such that the diodes $Dc_2$ and $Dc_n$ become conducting. This does not affect the state of $TrC_2$, since the base potential thereof is positive, due to the low value of $FwA_2$, to an extent such that this transistor remains conducting. The base of $TrC_n$, however, becomes negative to an extent such that this transistor cannot become conducting, since the resistance of the photo-resistor $FwA_n$ is considerably higher because it is not exposed. Thus the change-over of the second defective amplifier is prevented. The diodes $Dc_1$ to $Dc_n$ serve for preventing the more positive potential at the junction of the resistors $Rc_2$ and $Rd_2$, when an amplifier, for example $V_2$, fails to operate, from being transmitted to the junctions of the corresponding resistors $Rc_1$ and $Ro_1$ and so on of the other detection members $D_1$ and so on, since otherwise the transistors $TrC_1$ and so on might become conducting.

The cut-off of the transistors $TrA_2$ and so on can be eliminated by connecting, by means of the switch S, the base of $TrD_2$ via a diode $Da_2$ transiently to the positive supply voltage so that this transistor does not become conducting and the negative bias voltage of the emitter of $TrA_2$ is obviated and the initial state is restored.

The cut-off of the transistors $TrC_2$ and so on can be eliminated by transiently interrupting the current through the photo-resistor $FwA_2$ by means of the same switch. Since the lamp $L_2$ is extenguished, the resistor $Re_2$ is substantially at the full negative potenial so that the transistor $TrC_2$ is cut off and the lamp $A_2$ ceases to burn.

When the time signal amplifier $V_1$ fails to operate, the photo-resistor $FwB_1$ is exposed to the lamp $A_1$, so that the input $I_1$ is connected to the input $I_2$ of the amplifier $V_2$. At the same time the lamp C illuminates the photo-resistor $FwC$ so that the time signal is recorded in an attenuated state.

What is claimed is:

1. A signal amplifier switching system comprising a plurality of simultaneously operative signal input channels including at least one time signal channel, a pluarity of signal amplifiers, each associated with one of said channels, means connecting each of said channels to its respective amplifier, first detecting means connected to the output of each of said amplifiers but said time signal channel amplifier and responsive to the absence of a signal from any one of said signal amplifiers but said time signal channel amplifiers for switching the signal channel input of said amplifier to the time signal channel, and second detecting means connected to the output of said time signal channel amplifier and responsive to the absence of a signal therefrom for switching the time signal channel input of said time signal channel amplifier to another of said signal input channels.

2. A signal amplifier switching system comprising a plurality of simultaneously operative signal input channels including at least one time signal channel, a plurality of signal amplifiers, each associated with one of said channels, means connecting each of said channels to its respective amplifier, means coupling an auxiliary signal to each of said amplifiers, first detecting means connected to the output of each of said amplifiers but said time signal channel amplifier and responsive to the absence of an auxiliary signal from any one of said signal amplifiers but said time signal channel amplifier for switching the signal channel input of said amplifier to the time signal channel, and second detecting means connected to the output of said time signal channel amplifier and responsive to the absence of a signal therefrom for switching the time signal channel input of said time signal channel amplifier to another of said signal input channels.

3. The combination of claim 2 wherein said detecting means includes switching means responsive to the detected absence of said auxiliary signal for accomplishing the said switching function, said switching means comprising a photo-electric resistor connected between the input of each signal channel amplifier but the time signal amplifier and the time signal amplifier, an incandescent lamp associated with each of said amplifier channels, said detecting means responsive to the absence of said auxiliary signal in one of said channels for igniting said lamp, and exposing each respective lamp associated with each respective channel to the associated one of said photo-electric resistors.

4. The combination of claim 2 further including means responsive to said switching of a signal channel into said time channel for attenuating said time signal.

5. The combination of claim 4 wherein said means for attenuating includes a photo-resistor connected in the input of said time signal channel amplifier and responsive to a further incandescent lamp in the detector means which is activated upon the switching of a signal channel into the input of the time signal channel, said time channel photo-resistor responding to said further lamp for attenuating said time signal.

6. The combination of claim 2 further including means for blocking said detecting means to prevent restoration of a signal amplifier upon re-appearance of the auxiliary signal associated therewith.

References Cited

UNITED STATES PATENTS

| | | | |
|---|---|---|---|
| 2,229,089 | 1/1941 | Kinsburg | 330—124 X |
| 2,662,126 | 12/1953 | Henson | 330—148 X |
| 3,303,482 | 2/1967 | Jenkins | 340—174.1 |

ROY LAKE, *Primary Examiner.*

JAMES B. MULLINS, *Assistant Examiner.*

U.S. Cl. X.R.

330—124, 147, 148, 51